United States Patent
Tang

(10) Patent No.: US 11,093,800 B2
(45) Date of Patent: Aug. 17, 2021

(54) METHOD AND DEVICE FOR IDENTIFYING OBJECT AND COMPUTER READABLE STORAGE MEDIUM

(71) Applicant: BOE Technology Group Co., Ltd., Beijing (CN)

(72) Inventor: Xiaojun Tang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 154 days.

(21) Appl. No.: 16/473,007

(22) PCT Filed: Jan. 3, 2019

(86) PCT No.: PCT/CN2019/070207
§ 371 (c)(1),
(2) Date: Jun. 24, 2019

(87) PCT Pub. No.: WO2019/205729
PCT Pub. Date: Oct. 31, 2019

(65) Prior Publication Data
US 2020/0380292 A1 Dec. 3, 2020

(30) Foreign Application Priority Data
Apr. 26, 2018 (CN) .......................... 201810389080.2

(51) Int. Cl.
*G06K 9/62* (2006.01)
*G06N 3/04* (2006.01)

(52) U.S. Cl.
CPC ............. *G06K 9/627* (2013.01); *G06K 9/628* (2013.01); *G06K 9/6215* (2013.01); *G06N 3/0454* (2013.01)

(58) Field of Classification Search
None
See application file for complete search history.

(56) References Cited

U.S. PATENT DOCUMENTS 5,175,796 A * 12/1992 Refregier ............. G06K 9/6278
706/20
5,247,584 A * 9/1993 Krogmann ........... G06K 9/6293
382/107
(Continued)

FOREIGN PATENT DOCUMENTS

CN 101406390 A 4/2009
CN 101853389 A 10/2010
(Continued)

OTHER PUBLICATIONS

English translation of International Search Report and Box V of Written Opinion for International Application No. PCT/CN2019/070207, dated Apr. 10, 2019, 4 pages.
(Continued)

*Primary Examiner* — Anand P Bhatnagar
(74) *Attorney, Agent, or Firm* — Westman, Champlin & Koehler, P.A.

(57) ABSTRACT

According to the embodiments of the present disclosure, there are provided a method and device for identifying an object and a computer readable storage medium. The method includes: determining candidate categories of the object using a first neural network; and determining, in response to the candidate categories of the object having been determined, a category of the object using second neural networks respectively corresponding to the candidate categories. The device includes: a processor; a memory having stored thereon instructions which, when executed by the processor, cause the processor to: determine candidate categories of the object using a first neural network; and determine, in response to the candidate categories of the object having been determined, a category of the object using second neural networks respectively corresponding to the candidate categories.

13 Claims, 4 Drawing Sheets

(56) References Cited

U.S. PATENT DOCUMENTS

| | | | |
|---|---|---|---|
| 7,587,064 B2 * | 9/2009 | Owechko | G06K 9/469 |
| | | | 382/103 |
| 8,447,100 B2 | 5/2013 | Chen et al. | |
| 8,843,424 B2 | 9/2014 | Mei et al. | |
| 9,235,764 B2 | 1/2016 | Miyakoshi | |
| 9,400,935 B2 | 7/2016 | Chen et al. | |
| 9,576,201 B2 | 2/2017 | Wu et al. | |
| 9,858,496 B2 * | 1/2018 | Sun | G06K 9/3233 |
| 10,318,827 B2 * | 6/2019 | Jia | G06N 3/0454 |
| 2009/0097711 A1 | 4/2009 | Chen et al. | |
| 2012/0089545 A1 | 4/2012 | Mei et al. | |
| 2013/0236057 A1 | 9/2013 | Chen et al. | |
| 2014/0126772 A1 | 5/2014 | Miyakoshi | |
| 2015/0030255 A1 | 1/2015 | Wu et al. | |
| 2018/0039853 A1 * | 2/2018 | Liu | G06K 9/72 |
| 2019/0095716 A1 * | 3/2019 | Shrestha | G08B 21/187 |
| 2019/0294896 A1 * | 9/2019 | Jia | G06K 9/00369 |
| 2020/0089954 A1 * | 3/2020 | Zia | G06K 9/00671 |
| 2020/0372414 A1 * | 11/2020 | Maor | G06F 16/285 |
| 2020/0394458 A1 * | 12/2020 | Yu | G06N 3/084 |

FOREIGN PATENT DOCUMENTS

| | | |
|---|---|---|
| CN | 101996326 A | 3/2011 |
| CN | 102867172 A | 1/2013 |
| CN | 103810798 A | 5/2014 |
| CN | 104346620 A | 2/2015 |
| CN | 104657704 A | 5/2015 |
| CN | 106250921 A | 12/2016 |
| CN | 106535134 A | 3/2017 |
| CN | 106557778 A | 4/2017 |

OTHER PUBLICATIONS

International Search Report and Written Opinion for International Application No. PCT/CN2019/070207, dated Apr. 10, 2019, 9 pages.

First Office Action, including Search Report, for Chinese Patent Application No. 201810389080.2, dated Apr. 27, 2021, 19 pages.

Yan Z. et al., "HD-CNN: Hierarchical Deep Convolutional Neural Networks for Large Scale Visual Recognition", 2015 IEEE International Conference on Computer Vision, DOI: 10.1109/ICCV.2015.314, dated Dec. 31, 2015, 19 pages.

* cited by examiner

METHOD AND DEVICE FOR IDENTIFYING OBJECT AND COMPUTER READABLE STORAGE MEDIUM

CROSS-REFERENCE TO RELATED APPLICATION(S)

This application is a Section 371 National Stage application of International Application No. PCT/CN2019/070207, filed 3 Jan. 2019, which has not yet published, and claims priority to Chinese Patent Application CN201810389080.2, filed on Apr. 26, 2018, the contents of which are incorporated herein by reference in their entireties.

TECHNICAL FIELD

The present disclosure relates to the field of artificial intelligence, and more particularly, to a method and device for identifying an object, and a computer readable storage medium.

BACKGROUND

With the gradual rise of unmanned supermarkets, in order to realize automatic management of commodities in the supermarkets and automatic settlement of shopping carts, it is necessary to identify the commodities in the supermarkets using artificial intelligence technology such as image identification etc. to automatically identify categories of the commodities, thereby enhancing the user experience and reducing management costs.

SUMMARY

According to a first aspect of the present disclosure, there is provided a method for identifying an object. The method comprises: determining candidate categories of the object using a first neural network; and determining, in response to the candidate categories of the object having been determined, a category of the object using respective second neural networks respectively corresponding to the candidate categories.

In some embodiments, determining candidate categories of the object using a first neural network comprises: determining first feature similarities between the object and reference data of the categories using the first neural network; and determining categories corresponding to first feature similarities greater than or equal to a predetermined threshold among the first feature similarities as the candidate categories of the object.

In some embodiments, determining first feature similarities between the object and reference data of categories using the first neural network comprises: determining a first object feature vector of the object using the first neural network; and calculating first feature similarities between the first object feature vector and first reference feature vectors respectively, wherein the first reference feature vectors are determined respectively based on the reference data of categories using the first neural network.

In some embodiments, the predetermined threshold is a threshold which is set uniformly for all the first feature similarities or the predetermined threshold is thresholds which are set respectively for the first feature similarities and can be set independently of each other.

In some embodiments, the method further comprises: determining, in response to determining that there is only one candidate category of the object, the one candidate category as the category of the object.

In some embodiments, the method further comprises: providing, in response to determining that there is no candidate category of the object, an output indicating that the object cannot be identified.

In some embodiments, determining, in response to the candidate categories of the object having been determined, a category of the object using second neural networks respectively corresponding to the candidate categories comprises: determining, for each of the candidate categories, a second object feature vector of the object associated with the candidate category based on the first object feature vector using a corresponding second neural network; calculating second feature similarities between second object feature vectors of the object respectively associated with the candidate categories and second reference feature vectors respectively, wherein the second reference feature vectors are determined based on the first reference vectors using the second neural networks, respectively; and determining a category corresponding to the largest one of the second feature similarities as the category of the object.

In some embodiments, each of the second neural networks is trained by: using two samples belonging to a category corresponding to the second neural network as a positive sample pair, an expected output value of which is a positive reference value; using a sample belonging to the category corresponding to the second neural network and a sample not belonging to the category corresponding to the second neural network as a negative sample pair, an expected output value of which is a negative reference value; and using a squared error between a calculated value of a corresponding second feature similarity and an expected output value as a loss function.

In some embodiments, the first neural network is a convolutional neural network from which a fully connected layer for final classification is removed, and each of the second neural networks is a single layer fully connected neural network.

According to a second aspect of the present disclosure, there is provided a device for identifying an object. The device comprises: a processor; a memory having stored thereon instructions which, when executed by the processor, cause the processor to: determine candidate categories of the object using a first neural network; and determine, in response to the candidate categories of the object having been determined, a category of the object using second neural networks respectively corresponding to the candidate categories.

In some embodiments, the instructions, when executed by the processor, further cause the processor to: determine first feature similarities between the object and reference data of categories using the first neural network; and determine categories corresponding to first feature similarities greater than or equal to a predetermined threshold among the first feature similarities as the candidate categories of the object.

In some embodiments, the instructions, when executed by the processor, further cause the processor to: determine a first object feature vector of the object using the first neural network; and calculate first feature similarities between the first object feature vector and first reference feature vectors respectively, wherein the first reference feature vectors are determined respectively based on the reference data of categories using the first neural network.

In some embodiments, the predetermined threshold is a threshold which is set uniformly for all the first feature similarities or the predetermined threshold is thresholds which are set respectively for the first feature similarities and can be set independently of each other.

In some embodiments, the instructions, when executed by the processor, further cause the processor to: determine, in response to determining that there is only one candidate category of the object, the one candidate category as the category of the object.

In some embodiments, the instructions, when executed by the processor, further cause the processor to: output, in response to determining that there is no candidate category of the object, a message indicating that the object cannot be identified.

In some embodiments, the instructions, when executed by the processor, further cause the processor to: determine, for each of the candidate categories, a second object feature vector of the object associated with the candidate category based on the first object feature vector using a corresponding second neural network; calculate second feature similarities between second object feature vectors of the object respectively associated with the candidate categories and second reference feature vectors respectively, wherein the second reference feature vectors are determined based on the first reference vectors using the second neural networks, respectively; and determine a category corresponding to the largest one of the second feature similarities as the category of the object.

In some embodiments, each of the second neural networks is trained by: using two samples belonging to a category corresponding to the second neural network as a positive sample pair, an expected output value of which is a positive reference value; using a sample belonging to the category corresponding to the second neural network and a sample not belonging to the category corresponding to the second neural network as a negative sample pair, an expected output value of which is a negative reference value; and using a squared error between a calculated value of a corresponding second feature similarity and an expected output value as a loss function.

In some embodiments, the first neural network is a convolutional neural network from which a fully connected layer for final classification is removed, and each of the second neural networks is a single layer fully connected neural network.

According to a third aspect of the present disclosure, there is provided a computer readable storage medium having stored thereon instructions which, when executed by a processor, cause the processor to perform the method according to the first aspect of the present disclosure.

BRIEF DESCRIPTION OF THE DRAWINGS

The above and other purposes, features and advantages of the present disclosure will become more apparent from preferable embodiments of the present disclosure in conjunction with accompanying drawings, in which.

DETAILED DESCRIPTION

Figure 1:
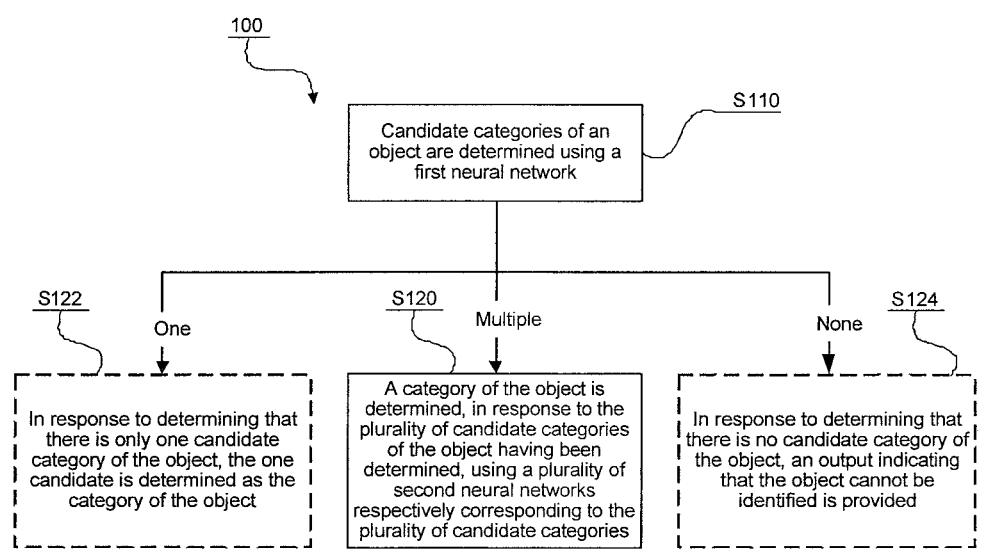
FIG. 1 is a flowchart illustrating an exemplary method for identifying an object according to an embodiment of the present disclosure.

In order to make the purposes, technical solutions and advantages of the present application more clear and obvious, the present application will be further described in detail below with reference to the accompanying drawings. It should be illustrated that the following description is used for illustration only, without limiting the present disclosure. In the description below, a number of specific details are explained to provide better understanding of the present disclosure. However, it is apparent to those skilled in the art that the present disclosure can be implemented without these specific details. In other instances, well known circuits, materials or methods are not described specifically so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the accompanying drawings are provided here for the purpose of illustration, and are not necessarily drawn to scale. The term "and/or" used herein means any and all combinations of one or more listed items.

A commonly-used object identification technique is to construct an object classifier using, for example, a Convolutional Neural Network (CNN). Different categories of commodities may be identified using the object classifier. However, this method has a poor scalability although it has high identification accuracy. For example, if a new commodity category is added, it needs to spend a lot of time on redesigning and retraining the entire classifier, which may not meet the requirements of supermarkets to quickly introduce new commodities.

In addition, in order to realize online expansion of a new category, some commodity identifiers identify commodities by performing feature extraction firstly and then performing feature comparison, which avoids retraining a feature extractor. However, the accuracy of the feature comparison in this way may decrease, and when a new category is relatively similar to an existing category, they are easy to be confused, which leads to misidentification.

As described above, in order to at least partially solve or alleviate the problem that a commonly-used object identification solution cannot achieve both a high identification rate and a high scalability, there is proposed a two-level object identification method capable of online expansion according to the embodiments of the present disclosure. This method generally comprises the following two steps: firstly, determining a feature vector of an image of an object using a first neural network, and performing rough identification on a category of the object through feature matching. In a case where a plurality of candidate categories of the object which are easy to be confused are identified in the rough identification process, the plurality of candidate categories of the object may be further identified and compared using second neural networks for these specific categories, so as to obtain a more accurate identification result. In a case of using such a solution, both high identification accuracy and a high scalability may be achieved.

It should be illustrated that although the embodiments of the present disclosure are described in a context of object image identification, the embodiments of the present disclosure are not limited thereto. In fact, concepts described in the embodiments of the present disclosure may be applied in any scenario where it needs to distinguish between a plurality of categories based on neural networks while a high scalability is required. For example, in addition to identifying an image of an object, for example, user behavior features may also be identified (so as to, for example, facilitate a developer of a website or application distinguishing between user categories thereof, such as malicious users, loyal users, users who infrequently access the website or application, users who frequently access the website or application, etc. based on user behaviors).

Before starting to describe the embodiments of the present disclosure, some of the technical terms which will be used herein will be briefly introduced firstly.

Convolutional Neural Network

Studies by Hubel and Wiesel et al. in 1950 and 1960 showed that visual cortexes of cats and monkeys contain neurons which make a response individually to small areas in the field of view. If eyes do not move, an area in a visual space in which a single neuron is affected by a visual stimulus is called a receptive field of the neuron. Adjacent neurons have similar and overlapping receptive fields. A size and a location of a receptive field systematically change on a cortex to form complete mapping of the visual space.

Under inspiration by this research, in the field of machine learning, there is proposed a Convolutional Neural Network (CNN or ConvNet for short), which is a kind of feed-forward artificial neural network. Specifically, a mode of connection between neurons of the neural network is inspired by a visual cortex of an animal. A single neuron makes a response to a stimulus in a limited area in a space, which is the above receptive field. Respective receptive fields of different neurons partially overlap each other, so that they are arranged to form the entire field of view. A response of a single neuron to a stimulus in its receptive field may be mathematically approximated by a convolution operation. Therefore, convolutional neural networks have a wide range of applications in fields such as image and video identification, recommended fields (for example, commodity recommendation of shopping websites, etc.), and natural language processing etc.

A convolutional neural network may generally comprise a plurality of functional layers, for example, convolutional layers, fully connected layers, etc., as will be described in detail below, may gradually change from local feature capture to global feature capture by a stack of a plurality of convolutional layers/fully connected layers etc., and may finally obtain an identification/classification result. As an intuitive example, in the field of face identification, for example, it may be considered that a first convolutional layer of the convolutional neural network may learn fine (or very local) features such as an eye color, an eye contour, eyelashes, a nose contour, a nose shadow, a mouth contour, a mouth color etc.; a second convolutional layer of the convolutional neural network may learn, from an output of the first convolutional layer, slightly larger features of facial organs such as eyes (which may be identified according to, for example, the eye color, the eye contour, the eyelashes etc.), a nose (which may be determined according to, for example, the nose contour, the nose shadow etc.), a mouse (which may be determined according to the mouth contour, the mouth color etc.) etc., which are globally larger than those learned by the first convolutional layer; and a third convolutional layer or fully connected layer of the convolutional neural network may learn, from an output of the second convolutional layer, more global features such as a face (which is determined according to the eyes, the nose, the mouth, etc.), and finally determine that there is a face in an image or determine a position of a feature point of the face. Of course, the present disclosure is not limited thereto. In addition, a detailed description of the fully connected layer will be given hereinafter and will not be discussed in detail herein.

However, although the above examples are given in a manner which may be understood by humans, in fact, the features learned by the CNN are usually not semantic features which may be understood by humans, but rather abstract features which usually cannot be understood by humans at all. However, a computer may determine that this is a face and determine various parts of the face by combining these features together. For convenience of understanding, it may be considered that a criterion for a person to determine whether there is a face may be to see whether there are any human eyes, nose, or mouth in an image; another criterion for a person to determine whether there is a face may be to see whether there are any human eyebrows, chin etc. in the image; and a further criterion for a strange person to determine whether there is a face may be to see whether there are glasses, a mask, earrings, etc. in the image. The convolutional neural network, perhaps as the strangest "person", may determine whether there is a face and determine parts of the face using a series of features, for example, a combination of some particular pixels, which cannot be described by humans in words.

Convolutional Layer

A convolutional layer is a core constitutional unit of a CNN. Parameters of this layer may comprise a set of learnable convolution kernels (or simply convolution kernels), wherein each convolution kernel has a small receptive field, but extends over an entire depth of input data. In a forward process, each convolution kernel is convolved along a width and a height of the input data to calculate a dot product between elements of the convolution kernel and the input data, and generate a two-dimensional activation map of the convolution kernel. As a result, the network may learn a convolution kernel which may be activated when a certain particular type of feature is seen at a certain spatial location of the input.

For example, assuming that the input data and the convolution kernel are 4×4 and 2×2 matrices respectively on a left side of an equation below, a result of an convolution operation is shown in the equation (1) as follows:

$$\begin{bmatrix} 1 & 1 & 1 & 0 \\ 0 & 1 & 1 & 1 \\ 0 & 0 & 1 & 1 \\ 0 & 1 & 1 & 0 \end{bmatrix} \otimes \begin{bmatrix} 1 & 0 \\ 0 & 1 \end{bmatrix} = \begin{bmatrix} 2 & 2 & 2 \\ 0 & 2 & 2 \\ 1 & 1 & 1 \end{bmatrix} \quad (1)$$

where $\otimes$ is a convolution operator.

If the convolution kernel is a convolution kernel for identifying a particular object (for example, eyes), it may be seen that a possibility that the object appears on an upper right side of the output as the result on the right side of the equation is higher than a possibility that the object appears on a lower left side of the output. As described above, a process of feature identification gradually evolving from local feature identification to global feature identification may be realized by a stack of a plurality of convolutional layers.

Fully Connected Layer

Typically, global feature capture in a convolutional neural network may be achieved through a fully connected layer after a plurality of convolutional layers. The fully connected layer is actually a special convolutional layer having a convolution kernel that has full connections to all elements output by a previous layer, which is the same as a conventional neural network. Therefore, matrix multiplication may be used directly for the fully connected layer.

Specifically, an output of the fully connected layer may be a one-dimensional array in which each element may represent an indicator indicating a possibility that an image is classified into a certain category. In a context of face feature identification, the output may be used, for example, to determine whether there is a face in the image, a gender, a race, an age, etc. of the face etc., and the present disclosure is not limited thereto.

Next, a flowchart of a method for identifying an object according to an embodiment of the present disclosure will be described in detail with reference to FIG. 1.

FIG. 1 is a flowchart illustrating an exemplary method 100 for identifying an object according to an embodiment of the present disclosure. As shown in FIG. 1, the method 100 may comprise steps S110 and S120. However, the embodiments of the present disclosure are not limited thereto, and in fact the method 100 may comprise other more steps, sub-steps, etc., or steps S110 and/or S120 may be replaced with steps or sub-steps which implement the same or similar functions.

As shown in FIG. 1, the method 100 may start at step S110. In step S110, candidate categories of an object may be determined using a first neural network. In this step S110, preliminary classification or rough classification may mainly be performed on the object using the first neural network as a general object identifier. In some embodiments, the first neural network may be a CNN. Further, in some embodiments, the first neural network may be a convolutional neural network which does not have a fully connected layer for final classification. In a specific embodiment, the first CNN may use different network structures according to design requirements.

For example, an object identification network, for example, MobileNet, VGG network, ResNet network, etc. which are well-known in the field of deep learning, may be used, but a unique or dedicated CNN network may also be built by oneself. Further, in a case of object identification, a fully connected layer of each of the object identification networks for outputting a category may be removed to form a corresponding CNN feature extraction system. By taking the VGG-19 network as an example, the VGG-19 network comprises sixteen convolutional layers and three fully connected layers (as well as various auxiliary layers, for example, a pooling layer, an activation layer, etc.), wherein a last one of the three fully connected layers is responsible for performing classification, and may output a final classification result according to calculation results of first eighteen layers. When the VGG-19 network is used as the first neural network in the embodiment for identification, a last fully connected layer for final classification may be removed therefrom, and only preceding layers are used to determine the candidate categories of the object, which may specifically be implemented as described below. As another example, in a case of identification using the MobileNet or ResNet network, a fully connected layer for final classification may also be removed therefrom. In a context of the present specification, features extracted by the first neural network from which the fully connected layer for final classification is removed may be referred to as a first object feature vector or F1. Hereinafter, an exemplary implementation of step S110 will be described in detail in conjunction with FIG. 2.

In some embodiments, various parameters of the first neural network may be obtained by training. For example, the first neural network may be followed by a fully connected layer for classification (for example, a fully connected layer of the above VGG19 network, a fully connected layer of the above ResNet network, etc.), which has a dimension of an output equal to a number of categories of the object. The output of the fully connected layer may then be converted to a probability that the identified object belongs to a category using a Softmax function, which has a specific form as follows:

$$\sigma: \mathbb{R}^K \to (0, 1)^K$$

$$\sigma(z_j) = \frac{e^{z_j}}{\sum_{k=1}^{K} e^{z_k}}$$

where K is a dimension of an output vector z of a fully connected layer or a number of categories of an object, $z_j$ is a $j^{th}$ element of the output vector z, $\sigma(z_j)$ is a category probability distribution of $z_j$, and e is a natural logarithm. Softmax is used to map each element in, for example, a K-dimensional real number vector (for example, the output of the above fully connected layer) into an interval of (0, 1), and a sum of all the elements of the K-dimensional real number vector is 1, so as to form the category probability distribution.

Further, in some embodiments, the first neural network may be trained using a large number of object sample images (each object sample image is labeled with a category) as training samples and using a cross entropy as a loss cost function in the training process, to obtain an optimal first neural network by minimizing the cost function. It should be illustrated that when a new object category is introduced, the first neural network may be retrained or the first neural network may not be retrained. In a case of not retraining the first neural network, a workload required for retraining may be reduced at the expense of reduced identification accuracy. However, this cost is acceptable in view of using second neural networks trained for particular categories in a subsequent process. In other words, in some embodiments, the first neural network may not be retrained when a new object category is introduced.

Next, returning back to FIG. 1, in step S120, a category of the object may be determined, in response to the plurality of candidate categories of the object having been determined, using a plurality of respective second neural networks corresponding to the plurality of candidate categories. In some embodiments, at least one of the plurality of second neural networks may be single layer fully connected neural networks trained for respective categories. In some embodiments, all of the plurality of second neural networks may be single layer fully connected neural networks trained separately for respective categories. In other words, in a case where the candidate categories of the object are determined according to step S110 and there are a plurality of candidate categories, step S120 may be performed. Hereinafter, an exemplary implementation of step S120 will be described in detail in conjunction with FIG. 4. Step S120 is mainly used to further accurately determine an actual category of the object among the plurality of similar candidate categories. Since a corresponding second neural network is set and trained for each category, this step has very good scalability. In other words, second neural networks which have been trained for existing categories need not to be retrained when a new object category is added, and may be directly applied.

Further, as shown in FIG. 1, the method 100 may further comprise step S122 and/or step S124. In some embodiments, in a case where the candidate categories of the object are determined according to step S110 and there is only one candidate category, step S122 may be performed, that is, in response to determining that there is only one candidate category of the object, the one candidate may be determined as the category of the object. In some embodiments, if the candidate categories of the object are determined according to step S110 and no candidate category of the object is determined, step S124 may be performed, that is, in response to determining that there is no candidate category of the object, a message indicating that the object cannot be identified may be output.

However, it should be illustrated that step S122 and step S124 are not essential steps of the method 100. For example, in some other embodiments, when it is determined, for example, that there is only one candidate category, the category of the object may still further be determined using the second neural networks as in step S120, instead of directly determining the candidate category as the category of the object as in step S122 of FIG. 1. As another example, in some other embodiments, when it is determined, for example, that there is no candidate category step S110 may be performed again while reducing respective thresholds as described below in connection with FIG. 2, until it is determined that there is at least one candidate category. Similarly, in a case where it is determined that there is only one candidate category, the procedure may also return back to step S110 and reduce the thresholds to increase a number of candidate categories. In summary, step S122 and step S124 are both alternative steps.

Figure 2:
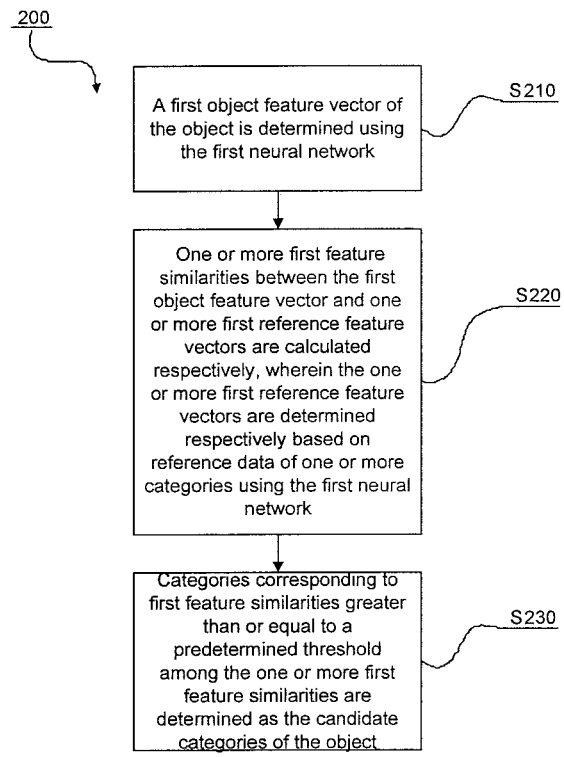
FIG. 2 is a flowchart illustrating an exemplary method for determining candidate categories of an object according to an embodiment of the present disclosure.
Figure 3:
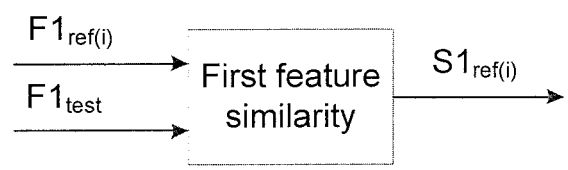
FIG. 3 illustrates an exemplary block diagram for determining candidate categories of an object according to an embodiment of the present disclosure.

FIG. 2 is a flowchart illustrating an exemplary method 200 for determining candidate categories of an object according to an embodiment of the present disclosure. FIG. 3 illustrates a block diagram for determining candidate categories of an object according to an embodiment of the present disclosure. As shown in FIG. 2, the method 200 may comprise steps S210, S220 and S230. However, the embodiments of the present disclosure are not limited thereto, and in fact the method 200 may comprise other more steps, sub-steps, etc., or steps S210, S220, and/or S230 may be replaced with steps or sub-steps which implement the same or similar functions. As described above, in step S110 shown in FIG. 1, specific steps of the method 200 shown in FIG. 2 may be used; however, the present disclosure is not limited thereto.

As shown in FIG. 2, the method 200 may start at step S210. In step S210, a first object feature vector (for example, F1 described above) of the object may be determined using the above first neural network. As described above, the first neural network may be a convolutional neural network from which a fully connected layer for final classification is removed.

Next, in step S220, one or more first feature similarities between the first object feature vector and one or more first reference feature vectors may be calculated respectively, wherein the one or more first reference feature vectors are determined respectively based on reference data of one or more categories using the first neural network. For example, in some embodiments, the one or more first reference feature vectors may be reference data determined by performing feature extraction on reference images of various categories of objects using the above first neural network. Features of the reference images may be calculated and stored in advance.

As shown in FIG. 3, in some embodiments, the first feature similarities between the first object feature vector and the one or more first reference feature vectors may be determined using various distance metrics. In some embodiments, a cosine distance or a Euclidean distance may be used as a measure of each of the first feature similarities. For example, if a Euclidean distance is used, the first feature similarity may be calculated as follows:

$$S1_{ref(i)} = \|F1_{ref(i)} F1\|_2$$

where $S1_{ref(i)}$ is a first feature similarity between the first object feature vector of the object and a first reference feature vector of an $i^{th}$ reference object, $F1_{ref(i)}$ represents the first reference feature vector of the $i^{th}$ reference object, and $\|\cdot\|_2$ is a Euclidean distance. In addition, a value of a similarity based on a cosine distance is in a range of, for example, −1 to 1, and the larger the value is, the more similar the first object feature vector is to the first reference feature vector.

Then, in step S230, categories corresponding to first feature similarities greater than or equal to a predetermined threshold among the one or more first feature similarities may be determined as the candidate categories of the object. For example, after a first feature similarity $S1_{ref(i)}$ between the object and one of one or more reference objects is determined, a threshold Th1 may be set, and if the similarity $S1_{ref(i)}$ is greater than or equal to Th1, it may be considered that the object is successfully matched with the reference object, and a category corresponding to $S1_{ref(i)}$ is regarded as a candidate category of the object. On the contrary, if the similarity $S1_{ref(i)}$ is less than Th1, it may be considered that the object is unsuccessfully matched with the reference object, and it may be determined that the object does not belong to the corresponding category.

Further, in some other embodiments, different similarity thresholds Th1 may be set for different categories. For example, a similarity threshold $Th1_1$ may be set for a first category (for example, beverage), and a similarity threshold $Th1_2$ may be set for a second category (for example, bread). Thus, characteristics of different categories may be reflected by setting different similarity thresholds for the different categories. This is because similarities between some categories of objects and similar categories of objects are higher than those between some other categories of objects and similar categories of objects. For example, for a plurality of categories of objects having substantially the same shape, a higher similarity threshold needs to be set to distinguish between the different object categories, while for some other categories of objects, if a too high similarity threshold is set, it may result in incorrect identification of the same category of objects having a large shape difference. In other words, in some other embodiments, different similarity thresholds may be set for first feature similarities corresponding to different categories to more accurately reflect differences between the categories and common points within the categories.

Thus, with the embodiment shown in FIG. 2, the candidate categories of the object may be determined using the first neural network.

Figure 4:
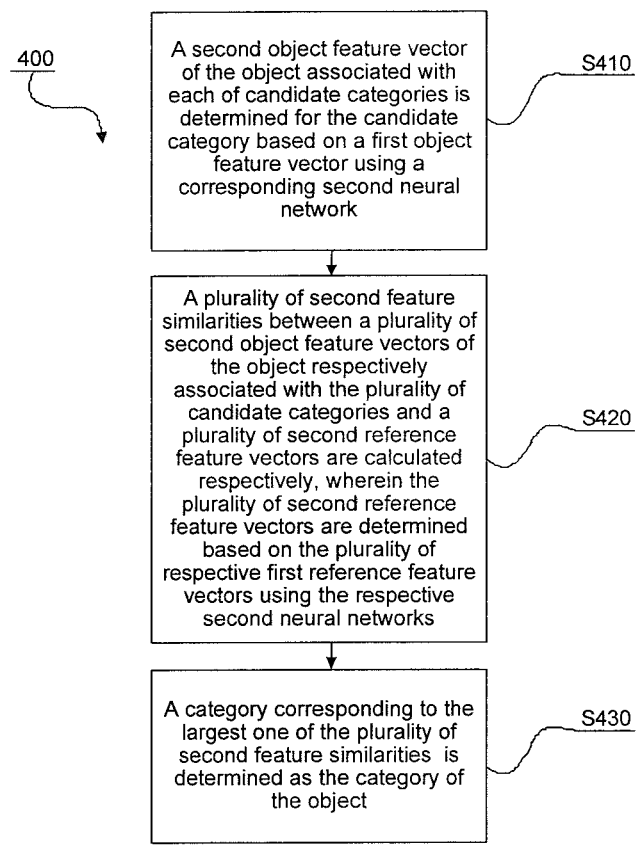
FIG. 4 is a flowchart illustrating an exemplary method for determining a category of an object according to candidate categories of the object using second neural networks according to an embodiment of the present disclosure.
Figure 5:
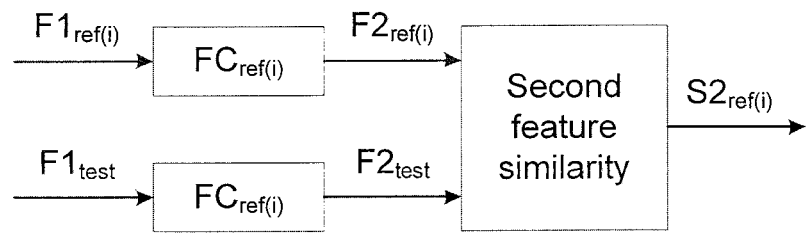
FIG. 5 illustrates an exemplary block diagram for determining a category of an object according to candidate categories of the object using second neural networks according to an embodiment of the present disclosure.

FIG. 4 is a flowchart illustrating an exemplary method 400 for determining a category of an object according to candidate categories of the object using second neural networks according to an embodiment of the present disclosure. FIG. 5 illustrates an exemplary block diagram for determining a category of an object according to candidate categories of the object using second neural networks according to an embodiment of the present disclosure. As shown in FIG. 4, the method 400 may comprise steps S410, S420 and S430. However, the embodiments of the present disclosure are not limited thereto, and in fact the method 400 may comprise other more steps, sub-steps, etc., or steps S410, S420 and/or S430 may be replaced with steps or sub-steps which implement the same or similar functions. As described above, in step S120 shown in FIG. 1, specific steps of the method 400 shown in FIG. 4 may be used; however, the present disclosure is not limited thereto.

As shown in FIG. 4, the method 400 may start at step S410. In step S410, a second object feature vector F2 of the object associated with each of candidate categories may be determined for the candidate category based on a first object feature vector F1 using a corresponding second neural network. In some embodiments, any of the second neural networks may be a single layer fully connected neural network trained for a corresponding category for accurately identifying the category of the object. In some embodiments, coefficients of the second neural network may be trained by, for example, using two samples belonging to a category corresponding to the second neural network as a positive sample pair, and using an expected output value as a positive reference value; using a sample belonging to the category corresponding to the second neural network and a sample not belonging to the category corresponding to the second neural network as a negative sample pair, and using an expected output value as a negative reference value; and using a squared error between a calculated value of a corresponding second feature similarity (i.e., a similarity given by an output of the second neural network as explained below) and an expected output value as a loss function, to obtain optimal parameters of the second neural network through training by minimizing the loss function. By using a large number of sample pairs which are set in this way, a second neural network for a particular category may be trained to identify objects belonging to the particular category, that is, an object belonging to the category may be accurately distinguished from an object not belonging to the category. Even if a new category is added later, there is no need to retrain second neural networks for existing categories due to the new category.

Next, in step S420, a plurality of second feature similarities between a plurality of respective second object feature vectors of the object associated with the plurality of candidate categories and a plurality of respective second reference feature vectors may be calculated respectively, wherein the plurality of second reference feature vectors are determined based on the plurality of respective first reference feature vectors using the respective second neural networks. As shown in FIG. 5, a second reference feature vector $F2_{ref(i)}$ of a reference object belonging to each of the categories may be determined in advance for the reference object using a second neural network. Then, similarly to the calculation of the first feature similarities, the second feature similarities $S2_{ref(i)}$ between the second object feature vector F2 of the object and the respective second reference feature vectors $F2_{ref(i)}$ are calculated respectively. For example, in some embodiments, the second feature similarities $S2_{ref(i)}$ may be determined using a cosine distance or a Euclidean distance. For example, the second feature similarity $S2_{ref(i)}$ may be calculated using the following equation:

$$S2_{ref(i)} = \|F2_{ref(i)} - F2\|_2$$

where $S2_{ref(i)}$ is a second feature similarity between the second object feature vector of the object and a second reference feature vector of an $i^{th}$ reference object, $F2_{ref(i)}$ represents the second reference feature vector of the $i^{th}$ reference object, and $\|\cdot\|_2$ is a Euclidean distance.

Then, in step S430, a category corresponding to the largest one of the plurality of second feature similarities $S2_{ref(i)}$ may be determined as the category of the object. However, in some other embodiments, similarly to the processing of the first feature similarities $S1_{ref(i)}$, it is also possible to consider not only specific values of the second feature similarities but also weighting values or relative values. For example, in some other embodiments, second feature similarities for some categories, for example, those among different categories having large differences between objects, may be given higher weights, so that the weighted values of the second feature similarities are more representative of differences between categories; and on the contrary, second feature similarities for some categories, for example, those among different categories having small differences between objects, may be given lower weights, to put higher requirements on determining that an object belongs to the category. In other words, different weights may be set for different categories, so as to reflect differences between categories.

With the method for identifying an object as described above in connection with FIGS. 1, 2 and 4, a feature vector of an image of an object may be firstly extracted using a first neural network, and rough identification is performed on categories of the object through feature matching; and when a plurality of candidate categories of the object which are easy to be confused are identified through feature matching, the plurality of candidate categories of the object may further be identified and compared using second neural networks for these particular object categories, so as to obtain a more accurate identification result. Further, since there is no need to update the general first neural network and different second neural networks may be trained for particular categories, the method for identifying an object also has characteristics of being easy to be expanded and maintained when the categories of the object to be identified are expanded.

Figure 6:
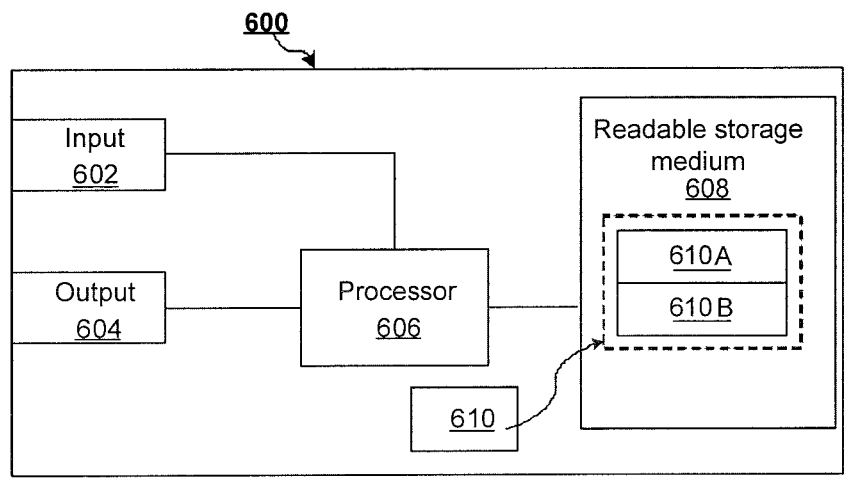
FIG. 6 is a block diagram illustrating an exemplary hardware arrangement of an exemplary device for identifying an object according to an embodiment of the present disclosure.

FIG. 6 is a block diagram illustrating an exemplary hardware arrangement of an exemplary device 600 for identifying an object according to an embodiment of the present disclosure. The device 600 may comprise a processor 606 (for example, a Digital Signal Processor (DSP), a Central Processing Unit (CPU), a microcontroller, a microprocessor or any processing device). The processor 606 may be a single processing unit or a plurality of processing units for performing different actions of the flow described herein. The device 600 may further comprise an input unit 602 for receiving signals from other entities, and an output unit 604 for providing signals to other entities. The input unit 602 and the output unit 604 may be arranged as a single entity or separate entities.

In addition, the device 600 may comprise at least one readable storage medium 608 in a form of non-volatile or volatile memory, such as an Electrically Erasable Programmable Read-Only Memory (EEPROM), a flash memory, and/or a hard disk driver. The readable storage medium 608 comprises a computer program 610 which includes codes/computer readable instructions that, when executed by the processor 606 in the device 600, cause the hardware arrangement 600 and/or the device 600 including the hardware arrangement 600 to perform, for example, flows described above in connection with FIGS. 1, 2 and 4 and any variations thereof.

The computer program 610 may be configured with computer program codes having, for example, architecture of computer program blocks 610A-610B. Therefore, in an exemplary embodiment when the hardware arrangement is used in the device 600, the codes in the computer program of the arrangement may comprise a program block 610A for determining candidate categories of the object using a first neural network. The codes in the computer program further comprise a program block 610B for determining, in response to the candidate categories of the object having been determined, a category of the object using respective second neural networks corresponding to the candidate categories.

The computer program blocks may substantially perform the various actions in the flow shown in FIGS. 1, 2 and 4 to simulate any dedicated hardware device. In other words, when different computer program modules are executed in the processor 606, they may correspond to respective hardware units in the dedicated hardware device.

Although the codes in the embodiments disclosed above in conjunction with FIG. 6 are implemented as computer programs that, when executed in the processor 606, cause the device 600 to perform the actions described above in connection with FIGS. 1, 2 and 4, in alternative embodiments, at least one of the codes may be implemented at least in part as a hardware circuit.

The processor may be a single Central Processing Unit (CPU), but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a Random Access Memory (RAM), a Read Only Memory (ROM), and an EEPROM, and the computer program module may, in an alternative embodiment, be distributed to different computer program products in a form of memory within the UE.

The present disclosure has been described in connection with the preferable embodiments. It should be understood that various other changes, substitutions and additions may be made by those skilled in the art without departing from the spirit and scope of the present disclosure. Therefore, the scope of the present disclosure is not limited to the specific embodiments described above, but is defined by the appended claims.

In addition, functions described herein as being implemented by pure hardware, pure software, and/or firmware may also be implemented by dedicated hardware, a combination of general-purpose hardware and software, etc. For example, functions described as being implemented by dedicated hardware (for example, a Field Programmable Gate Array (FPGA), an Application Specific Integrated Circuit (ASIC), etc.) may be implemented by a combination of general purpose hardware (for example, a Central Processing Unit (CPU), a Digital Signal Processor (DSP) and software, and vice versa.

I claim:

1. A method for identifying an object, comprising:
determining candidate categories of the object using a first neural network; and
determining, in response to the candidate categories of the object having been determined, a category of the object using second neural networks respectively corresponding to the candidate categories:
wherein the determining candidate categories of the object using a first neural network comprises;
determining a first object feature vector of the object using the first neural network;
calculating first feature similarities between the first object feature vector and first reference feature vectors, respectively, wherein the first reference feature vectors are determined respectively based on the reference data of categories using the first neural network; and
determining categories corresponding to first feature similarities greater than or equal to a predetermined threshold among the first feature similarities as the candidate categories of the object;
wherein the determining a category of the object using second neural networks respectively corresponding to the candidate categories comprises:
determining, for each of the candidate categories, a second object feature vector of the object associated with the candidate category based on the first object feature vector using a corresponding second neural network;
calculating second feature similarities between second object feature vectors of the object respectively associated with the candidate categories and second reference feature vectors, respectively, wherein the second reference features vectors are determined based on the first reference vectors using the second neural networks, respectively; and
determining a category corresponding to the largest one of the second feature similarities as the category of the object.

2. The method according to claim 1, wherein the predetermined threshold is a threshold which is set uniformly for all the first feature similarities or the predetermined threshold is thresholds which are set respectively for the first feature similarities and can be set independently of each other.

3. The method according to claim 1, further comprising:
determining, in response to determining that there is only one candidate category of the object, the one candidate category as the category of the object.

4. The method according to claim 1, further comprising:
outputting, in response to determining that there is no candidate category of the object, a message indicating that the object cannot be identified.

5. The method according to claim 1, wherein each of the second neural networks is trained by:
using two samples belonging to a category corresponding to the second neural network as a positive sample pair, an expected output value of which is a positive reference value;

using a sample belonging to the category corresponding to the second neural network and a sample not belonging to the category corresponding to the second neural network as a negative sample pair, and an expected output value of which is a negative reference value; and
using a squared error between a calculated value of a corresponding second feature similarity and an expected output value as a loss function.

6. The method according to claim 1, wherein the first neural network is a convolutional neural network from which a fully connected layer for final classification is removed, and each of the second neural networks is a single layer fully connected neural network.

7. A device for identifying an object, comprising:
a processor;
a memory having stored thereon instructions which, when executed by the processor, cause the processor to:
  determine candidate categories of the object using a first neural network; and
  determine, in response to the candidate categories of the object having been determined, a category of the object using second neural networks corresponding to the candidate categories, respectively,
wherein the instructions, when executed by the processor, further cause the processor to:
  determine a first object feature vector of the object using the first neural network;
  calculate first feature similarities between the first object feature vector and first reference feature vectors, respectively, wherein the first reference feature vectors are determined respectively based on the reference data of categories using the first neural network; and
  determine categories corresponding to first feature similarities greater than or equal to a predetermined threshold among the first feature similarities as the candidate categories of the object;
wherein the instructions, when executed by the processor, further cause the processor to:
  determine, for each of the candidate categories, a second object feature vector of the object associated with the candidate category based on the first object feature vector using a corresponding second neural network;
  calculate second feature similarities between second object feature vectors of the object respectively associated with the candidate categories and second reference feature vectors, respectively, wherein the second reference features vectors are determined based on the first reference vectors using the second neural networks, respectively; and
  determine a category corresponding to the largest one of the second feature similarities as the category of the object.

8. The device according to claim 7, wherein the predetermined threshold is a threshold which is set uniformly for all the first feature similarities or the predetermined threshold is thresholds which are set respectively for the first feature similarities and can be set independently of each other.

9. The device according to claim 7, wherein the instructions, when executed by the processor, further cause the processor to:
  determine, in response to determining that there is only one candidate category of the object, the one candidate category as the category of the object.

10. The device according to claim 7, wherein the instructions, when executed by the processor, further cause the processor to:
  output, in response to determining that there is no candidate category of the object, a message indicating that the object cannot be identified.

11. The device according to claim 7, wherein each of the second neural networks is trained by:
  using two samples belonging to a category corresponding to the second neural network as a positive sample pair, an expected output value of which is a positive reference value;
  using a sample belonging to the category corresponding to the second neural network and a sample not belonging to the category corresponding to the second neural network as a negative sample pair, an expected output value of which is a negative reference value; and
  using a squared error between a calculated value of a corresponding second feature similarity and an expected output value as a loss function.

12. The device according to claim 7, wherein the first neural network is a convolutional neural network from which a fully connected layer for final classification is removed, and each of the second neural networks is a single layer fully connected neural network.

13. A non-transitory computer readable storage medium having stored thereon instructions which, when executed by a processor, cause the processor to perform the method according to claim 1.

* * * * *